United States Patent [19]

Koch et al.

[11] Patent Number: 5,573,610
[45] Date of Patent: Nov. 12, 1996

[54] TIRES CONTAINING A MONITORING DEVICE FOR MONITORING AN ENGINEERING CONDITION THEREIN

[75] Inventors: Russell W. Koch, Hartville, Ohio; John L. Turner, Nashville, Tenn.; Guy J. Walenga, Mt. Juliet, Tenn.; Hiroyoshi Takigawa, Nashville, Tenn.; Keizo Okamoto, Murfreesboro, Tenn.

[73] Assignee: Bridgestone/Firestone, Inc., Akron, Ohio

[21] Appl. No.: 453,414

[22] Filed: May 30, 1995

Related U.S. Application Data

[62] Division of Ser. No. 253,885, Jun. 3, 1994, Pat. No. 5,500,065.

[51] Int. Cl.$^6$ .......................... B60C 23/00; G08C 17/02; G01D 21/00
[52] U.S. Cl. .......................... 152/152.1; 152/539; 73/146; 340/447; 364/424.03; 364/424.04; 364/550
[58] Field of Search .......................... 152/152.1, 450, 152/539, 367; 364/558, 424.03, 424.04, 550; 340/825.54, 825.44, 447; 73/146.2, 146.5, 146; 455/38.3

[56] References Cited

U.S. PATENT DOCUMENTS

| | | | |
|---|---|---|---|
| 3,806,869 | 4/1974 | Davis, Jr. | 340/447 |
| 4,067,235 | 1/1978 | Markland et al. | 73/146.5 |
| 4,160,234 | 7/1979 | Karbo et al. | 340/443 |
| 4,311,985 | 1/1982 | Gee et al. | 340/447 |
| 4,319,220 | 3/1982 | Pappas et al. | 340/447 |
| 4,334,215 | 6/1982 | Frazier et al. | 340/539 |
| 4,449,248 | 5/1984 | Leslie et al. | 455/38.3 |
| 4,578,992 | 4/1986 | Galasko et al. | 73/146.5 |
| 4,609,905 | 9/1986 | Uzzo | 340/447 |
| 4,911,217 | 3/1990 | Dunn et al. | 152/152.1 |
| 5,181,975 | 1/1993 | Pollack et al. | 152/152.1 |

*Primary Examiner*—Michael W. Ball
*Assistant Examiner*—Francis J. Lorin
*Attorney, Agent, or Firm*—Carmen S. Santa Maria

[57] ABSTRACT

A method for monitoring various physical conditions of pneumatic tires, and to a tire including a monitoring device. More particularly, the invention relates to a method of monitoring tires which uses an active, self-powered programable electronic device which is installed in or on the interior surface of a pneumatic tire or on a tire rim. This device can be used for monitoring, storing and telemetering information such as temperature, pressure, tire rotations and/or other operating conditions of a pneumatic tire, along with tire identification information. The device can be activated by externally transmitted radio frequency waves and in response, the device compares or transmits information and provides a warning in the event a preselected limit is exceeded.

6 Claims, 8 Drawing Sheets

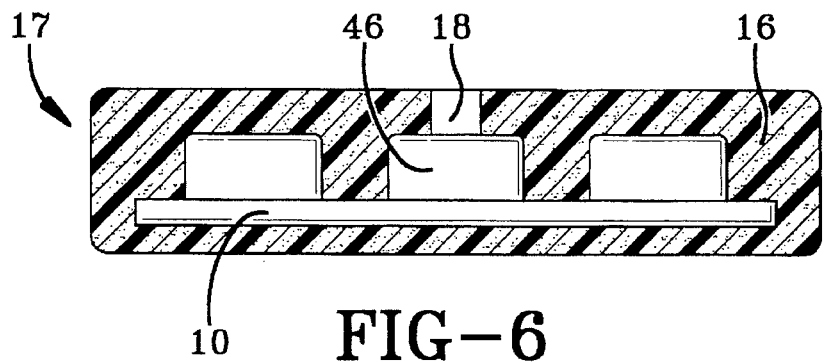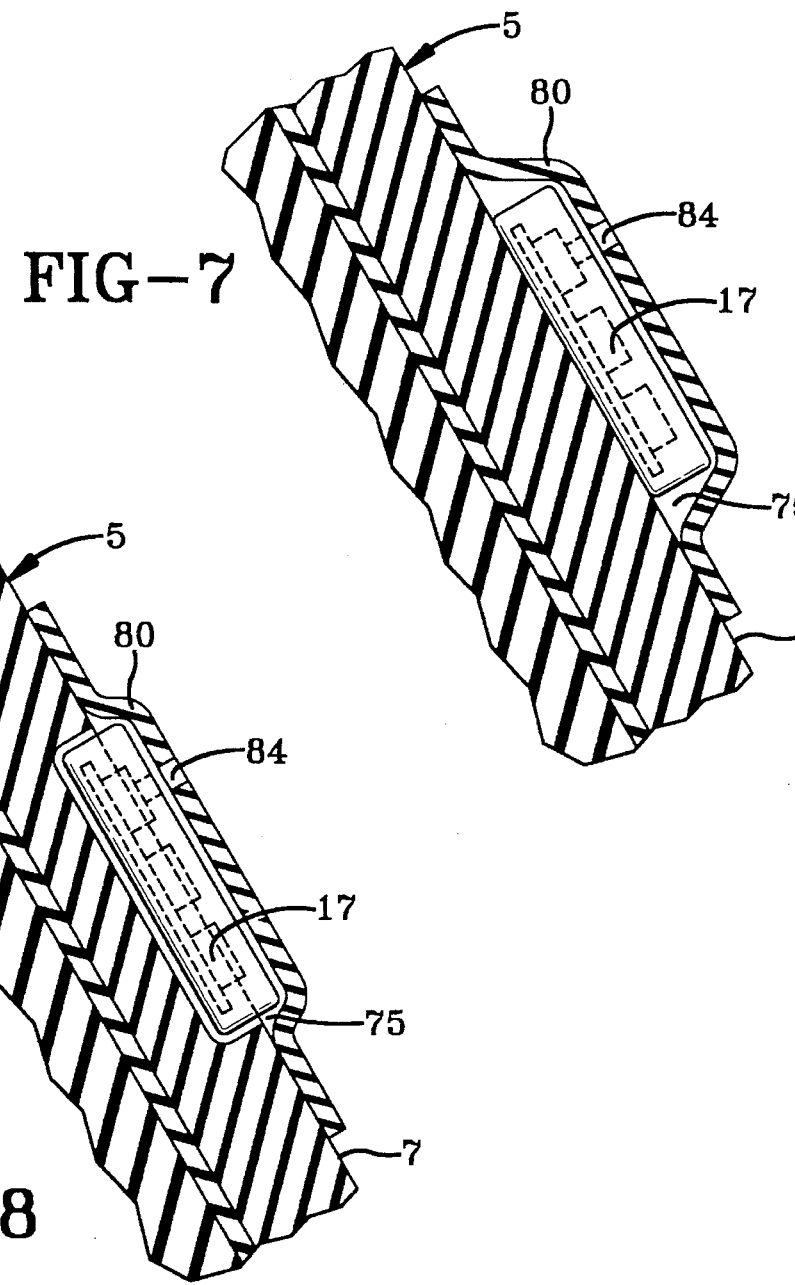

5,573,610

TIRES CONTAINING A MONITORING DEVICE FOR MONITORING AN ENGINEERING CONDITION THEREIN

This application is a divisional of application Ser. No. 08/253,885, filed Jun. 3, 1994, now U.S. Pat. No. 5,500,065.

FIELD OF THE INVENTION

This invention pertains to a method for monitoring various conditions of pneumatic tires and to tires containing a monitoring device. More particularly, the invention relates to a method of monitoring tires which uses an active, self-powered, programable electronic device which is generally installed in or on the interior portion of a pneumatic tire or on a tire rim. The device can be used for monitoring, storing and telemetering information such as temperature, pressure, tire mileage and/or other operating conditions of a pneumatic tire, along with tire identification information.

BACKGROUND OF THE INVENTION

It is desirable to monitor the condition of tires as to wear, internal temperature and internal pressure. It is particularly advantageous to monitor large truck tires since these are expensive and must be regularly maintained to maximize vehicle efficiency.

In the past, such monitoring activities have generally used a passive integrated circuit embedded within the body of the tire and activated by a radio frequency transmission which energizes the circuit by inductive magnetic coupling. Passive devices which rely on inductive magnetic coupling or capacitive coupling generally have the disadvantage of requiring lengthy coil windings, thus requiring major modifications in the tire construction and assembly process. Another serious disadvantage with such passive devices is that the interrogator must be positioned in very close proximity to the tire, usually within a few inches of the tire, in order to allow communication between the tire and the device. Because of the proximity requirements, continuous monitoring is impractical since it would require that an interrogator be mounted at each wheel of the vehicle. Manual acquisition of data from the passive devices embedded in each of the tires of a parked vehicle is also cumbersome and time consuming because of the proximity requirements.

Other prior art devices used for monitoring tire conditions have comprised self-powered circuits which are positioned external of the tire, such as at the valve stem. Externally mounted devices have the disadvantage of being exposed to damage, such as from weather and vandalism. Another disadvantage with installing devices external of the tire is that the device itself introduces additional sealed joints from which air may leak. Additionally, externally installed devices can easily become disassociated from a particular tire which is being monitored.

Another disadvantage with known tire monitoring and identification devices is that communication transmissions are achieved using conventional radio frequencies which generally require a relatively large antenna which must be mounted externally or secured to the tire in such a manner which requires relatively major modifications in the tire construction or assembly process.

SUMMARY OF THE INVENTION

In accordance with an aspect of the present invention, a method of monitoring tires is provided in which an activatable monitoring device or tag is mounted within at least one tire of a vehicle, on the interior surface thereof, or on the tire rim. The device is activated by means of an interrogator signal having a frequency in the microwave range. In response to the signal, the monitoring device measures and transmits information relating to one or more conditions such as the internal pressure and temperature of the tire, the number of rotations of the tire, and tire identification information. Desirably, the tire information is received at a monitoring station where the information can be viewed on a color coded, visual display, and even have an audio signal and/or flashing lights to indicate an undesirable condition with respect to acceptable values. The display can show all the tires of a vehicle sequentially or at the same time. Alternatively, the monitoring device can be activated to transmit the various conditions to a host storage device located in a weigh station, a trucking terminal, etc., which thus can record and contain the history of the transmitted condition values of the individual tires.

The monitoring device includes an active circuit which is powered by a dedicated, long life, miniature battery and one or more sensors for detecting and transducing operating conditions. The device further includes integrated circuitry; a programmable microprocessor for processing the electrical signals from the sensor and for data storage including tire identification information; and a microwave receiver/transmitter for receiving and telemetering the processed electrical signals from the sensors in response to an electromagnetic signal from an external interrogator. By using microwave frequency transmissions, it is possible to achieve relatively long-range transmissions using a relatively small antenna. The monitoring device can be installed either on new tires during the manufacturing process or added to existing tires.

The monitoring device is preferably capable of being programmed to remain in a dormant mode unless a condition limit has been exceeded such that the monitoring device does not respond to routine interrogation unless a condition limit has been exceeded.

The monitoring device can be secured to the tire wall by means of a pocket or cover which holds the device to the tire. The cover or pocket can be secured to the tire by utilizing a chemical or heat activatable adhesive. The monitoring device is secured to the tire in such a manner and location as to minimize stress, strain, cyclic fatigue, impact and vibration.

BRIEF DESCRIPTION OF THE DRAWINGS

FIG. 6 is a cross-sectional view of an encapsulated electronic monitoring device assembly;

FIG. 7 is a cross-sectional view of a monitoring device assembly which is mounted to the interior wall of a pneumatic tire by means of a cover secured to the interior wall of the pneumatic tire;

FIG. 8 is a cross-sectional view of a monitoring device assembly which is positioned within a recess on and is mounted to an interior wall of a pneumatic tire by means of a cover secured to the interior wall of the pneumatic tire;

DETAILED DESCRIPTION OF THE PREFERRED EMBODIMENTS

In accordance with an embodiment of the invention, a method of monitoring at least one condition of a tire is provided including the steps of providing the tire with an internally mounted monitoring device; sensing and measuring engineering conditions, including but not limited to temperature, pressure, distance, speed, etc. and/or storing the sensed conditions as data with the device pertaining to the monitored condition; activating the device to cause transmission of the measured data; and optionally comparing the data to preselected limits and signaling an alert if the limit is exceeded. The phrase "internally mounted" means that the monitoring device is built into the tire or mounted on an interior surface of a pressurizable cavity formed between the tire and the rim of a tire/rim combination or on the tire rim itself. The monitoring device is desirably activated by the transmission of a radio frequency interrogation signal when the tire is within a desired range of a signal transmitter. The monitored conditions can include pressure, temperature, or revolution and/or mileage information, and also tire history or identification information such as serial number, tire size, date and location of manufacture, retread information and the like.

In accordance with another embodiment of the invention, a tire is provided which is preferably a pneumatic tire having a monitoring device internally mounted within the tire at a location as noted in the above paragraph. Regardless of the monitoring device location, it optionally can be encased with materials set forth hereinbelow. When located in a recess or on the surface of the tire interior, it can optionally be housed within a cover or a pocket. The specific attachment or adhering means can be through the use of a chemical cure adhesive including a room temperature amine curable adhesive or a heat activatable cure adhesive.

Figure 1:
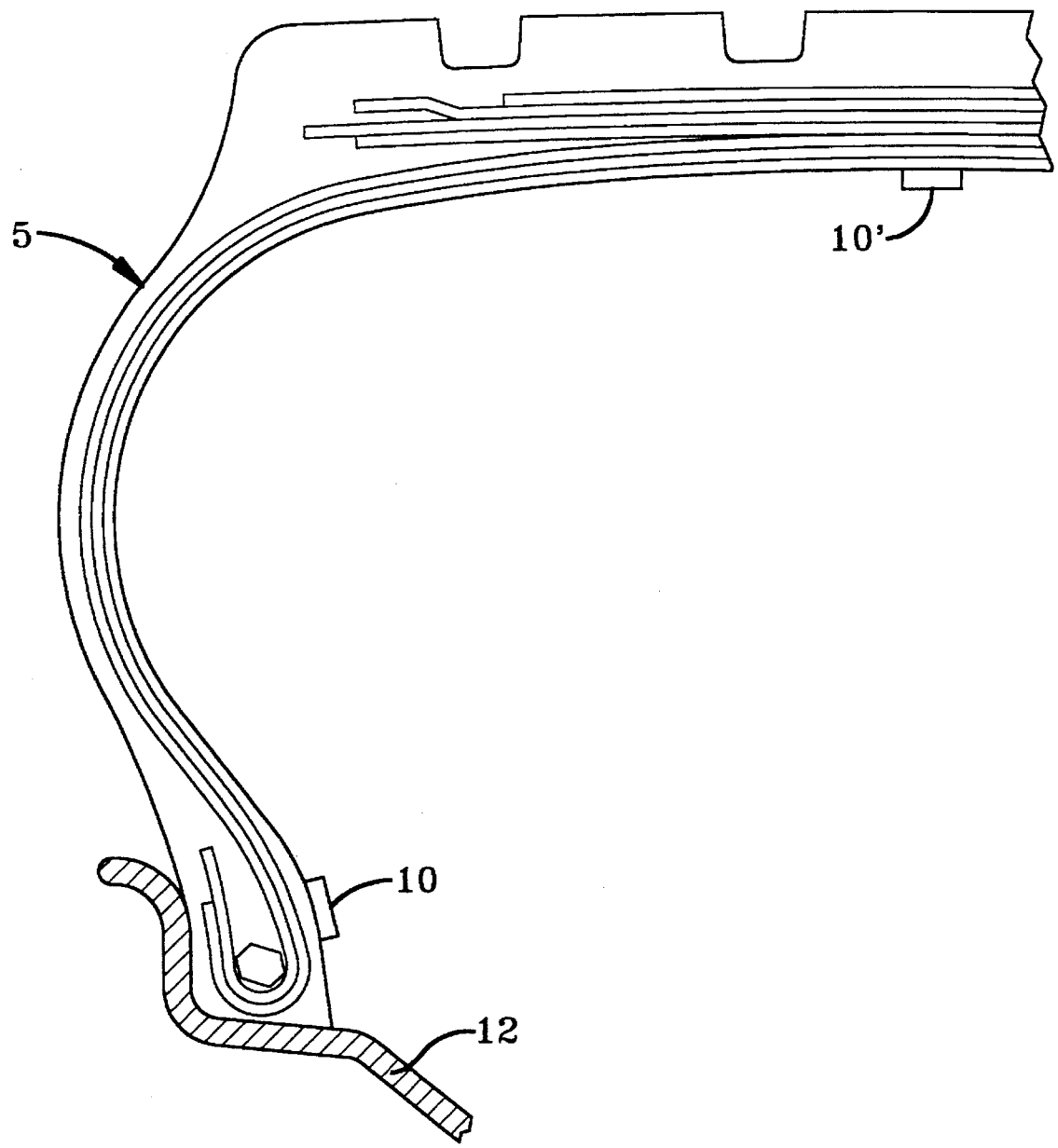
FIG. 1 is a partial cross-sectional view of a pneumatic tire in accordance with the invention with monitoring devices installed at two alternative locations within the pressurizable cavity of the pneumatic tire.

Referring now to the drawings, in FIG. 1 there is shown a partial sectional view of a pneumatic tire 5 having a monitoring device 10 or 10' secured to the inner wall of the pneumatic tire 5 at two preferred locations thereof. In practice, a pneumatic tire would generally have only one electronic monitoring device at any interior tire location or on tire rim 12. As apparent from FIG. 1, one preferred location is in the vicinity of the tire bead below the end of the body ply turn-up where the sidewall bending stiffness is greatest and where the rolling tire stresses are at a minimum. The lower most extent of the tire bead location wherein such properties are obtained is generally the bottom of the tire bead. In a specific tire, for example, a 285/75R24.5 R299 Truck/Bus Radial ("TBR"), this preferred location is a distance of about one to about two inches above the toe bottom of the tire. Above the noted range, the cyclic strain amplitudes grow very quickly. As also shown in FIG. 1, another preferred location of the monitoring device is on the inside of the tire at the center of the tread crown where tire stresses from mounting and dismounting are at a minimum.

Figure 2:
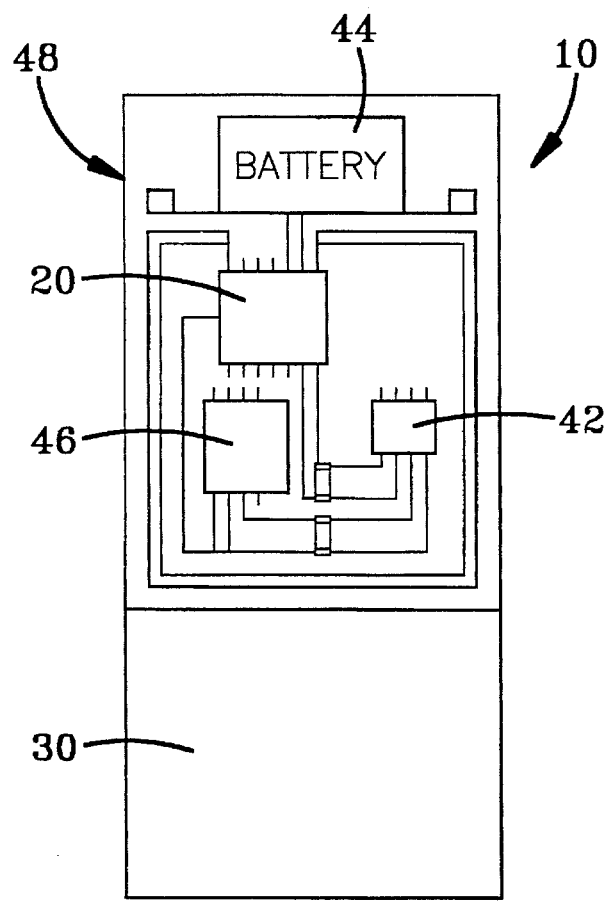
FIG. 2 is a block diagram of the electrical components and antenna of the monitoring device utilized with the present invention.

The monitoring device 10 is comprised of a microchip 20, an antenna 30, an amplifier 42, a battery 44, a pressure sensor 46, and optional temperature and mileage/distance sensors (not shown), populating a circuit board 48 as depicted in FIG. 2. While not shown in the embodiment of FIG. 2, it is envisioned that the microchip 20 itself can contain all or some of the aforementioned components.

While optional, it is desirable that the monitoring device be contained in a rigid or semi-rigid encasement to enhance rigidity and inhibit straining of the device. This reinforcing encasement or encapsulation is a solid material, i.e., non-foam compounds, which is compatible with the tire rubber, such as various urethanes, epoxies, unsaturated polyester-styrene resins, and hard rubber compositions. Hard rubber compositions generally refer to any type of rubber or elastomer which is crosslinked and has a Shore A hardness of from about 50 to about 100, and desirably a Shore D hardness of from about 5 to about 80 and preferably a Shore D hardness from about 40 to about 80. We have found that the solid materials most suitable for use as reinforcement encasement or encapsulation of the device typically have an elastic modulus (Young's Modulus, E) in the range of about 100 ksi (100,000 pounds per square inch) to about 500 (500,000 pounds per square inch) ksi. The actual selected elastic modulus of the solid reinforcement encasement materials used to encase the device are a function of the stiffness of the monitoring device itself.

An example of the monitoring device being encapsulated is shown in FIG. 6, wherein monitoring device 10 is encased within encasement or encapsulating material 16 to form monitoring device assembly 17. As shown in FIG. 6, it is an important aspect of the present invention that the sensor 46, which measures pressure, have an opening, aperture, etc., 18 to allow an air path to the sensor so it can measure the internal tire pressure.

Referring now to FIGS. 7 and 8, and as noted above, monitoring device assembly 17 can optionally have a flexible housing such as pocket 75 or cover 80. Suitable housing materials which function to hold the monitoring device to the tire include generally flexible and resilient rubbers such as natural rubber or rubbers made from conjugated dienes having from 4 to 10 carbon atoms such as synthetic polyisoprene, polybutadiene, styrene-butadiene rubber, and the like, flexible polyurethanes, flexible epoxies, and the like, and having a hardness on the Shore A hardness scale of from about 50 to about 95, and preferably from about 55 to about 75.

Figure 9:
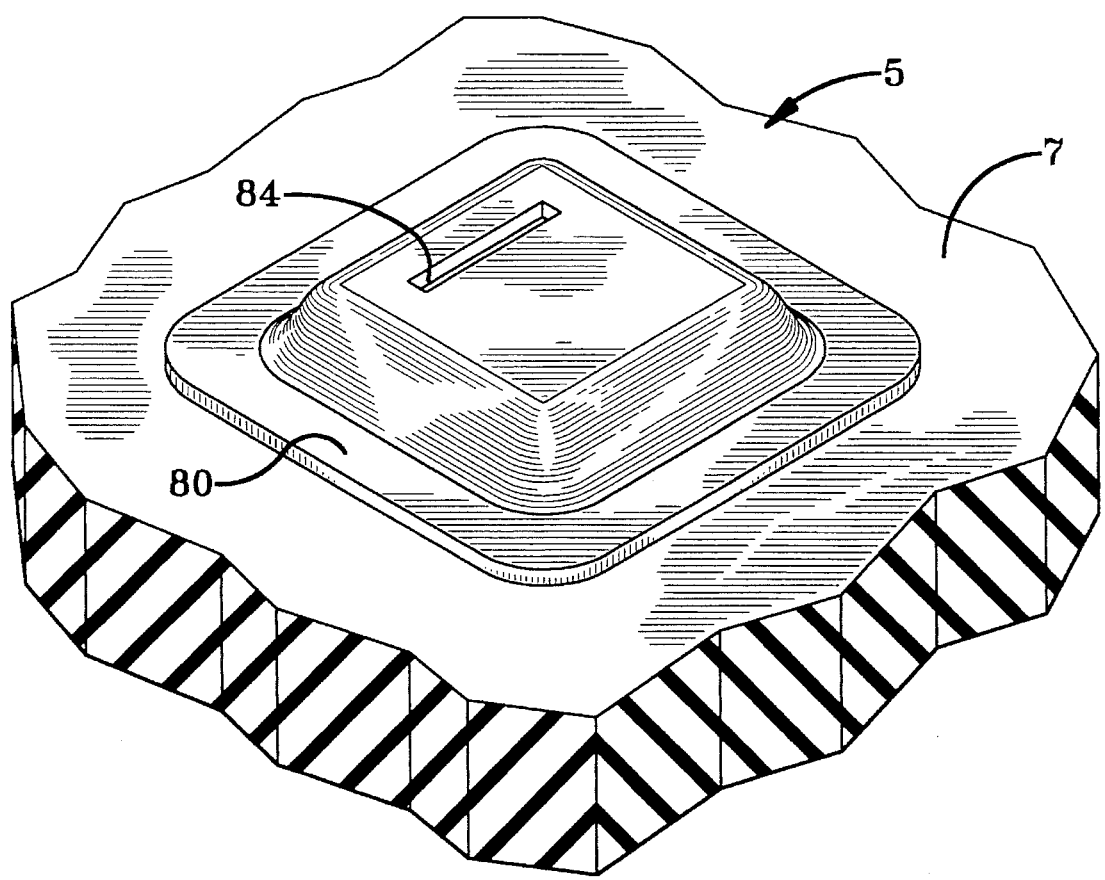
FIG. 9 is a perspective view of the cover securing the monitoring device assembly to the interior wall of the housing.

FIG. 9 is a perspective view of FIGS. 7 and 8 showing the cover 80 secured to the interior wall 7 of tire 5. The cover 80 has an adhering surface which secures the monitoring device assembly to a surface of the tire, preferably within the pressurizable tire cavity. Slit 84 provides an air passage so that the pressure sensor can appropriately monitor air pressure.

FIG. 7 shows monitoring device assembly 17 secured to tire 5 through cover 80. The cover has a slit 84 to allow a pressure sensor of the device to detect the internal tire pressure. Generally, cover 80 is secured to the interior portion of the tire. Except for the opening or slit 84 necessary for pressure sensing, the cover 80 surrounds the monitoring device assembly 17 as shown in FIG. 7, and is secured to the interior portion of the tire about the perimeter of the monitoring device assembly.

As apparent from FIG. 8, the monitoring device assembly 17 is located within tire pocket or recess 75. The tire pocket or recess 75 can be made by inserting a rectangular TEFLON® (PTFE) billet of the appropriate dimensions onto the uncured tire interliner at the location of the desired recess 75. During tire manufacturing, the curing pressure of the mold will press the billet into the tire inner liner and cure in the recess pocket 75 as shown in FIG. 8. Cover 80 is then attached about the perimeter of the monitoring device assembly to the tire inner liner. Cover 80 also has a slit 84 therein to allow detection of air pressure. Cover 80 may be co-cured with the green tire or may be attached to the tire after curing by use of various types of adhesives as discussed below.

Figure 10:
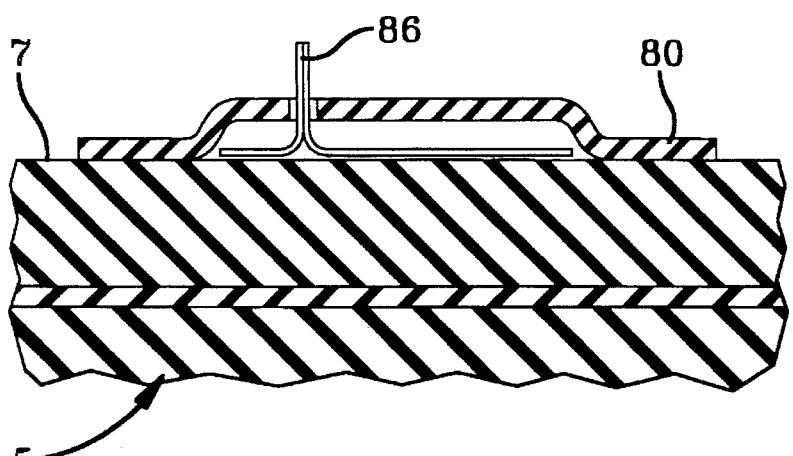
FIG. 10 is a cross-sectional view of a suitable cover formed on the interior wall of a pneumatic tire for securing a monitoring device thereto.

Referring now to FIG. 10, when a cover 80 such as shown in the configurations of FIGS. 7 and 8 is utilized, a non-adhering sheet 86, constructed, for example from TEFLON® (PTFE) or silicon release materials, can be placed between the cover 80 and the underlying tire inner wall 7 to ensure that a cavity is formed to house the monitoring device assembly. The cover is then adhered to the interior of the tire utilizing a suitable adhesive system. After curing of the adhesive system, the non-adhering sheet 86 is removed. The monitoring device, whether or not encapsulated, can then be inserted through the slot of flexible cover 80. Alternatively, the monitoring device, whether or not encapsulated, can be positioned in an abutting relationship with tire 5 and cover 80 installed thereover and adhered to tire 5 at the cover perimeter by a suitable adhesive.

Figure 11:
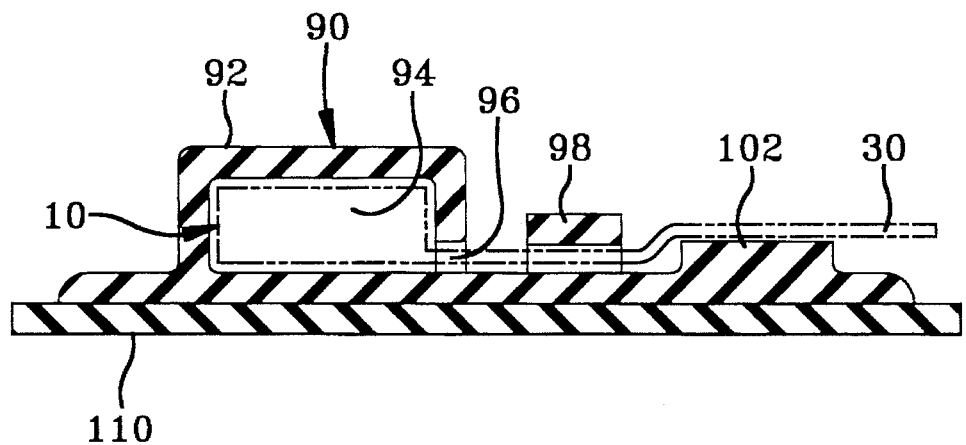
FIG. 11 is a sectional view of a pocket assembly in accordance with another embodiment of the invention.
Figure 12:
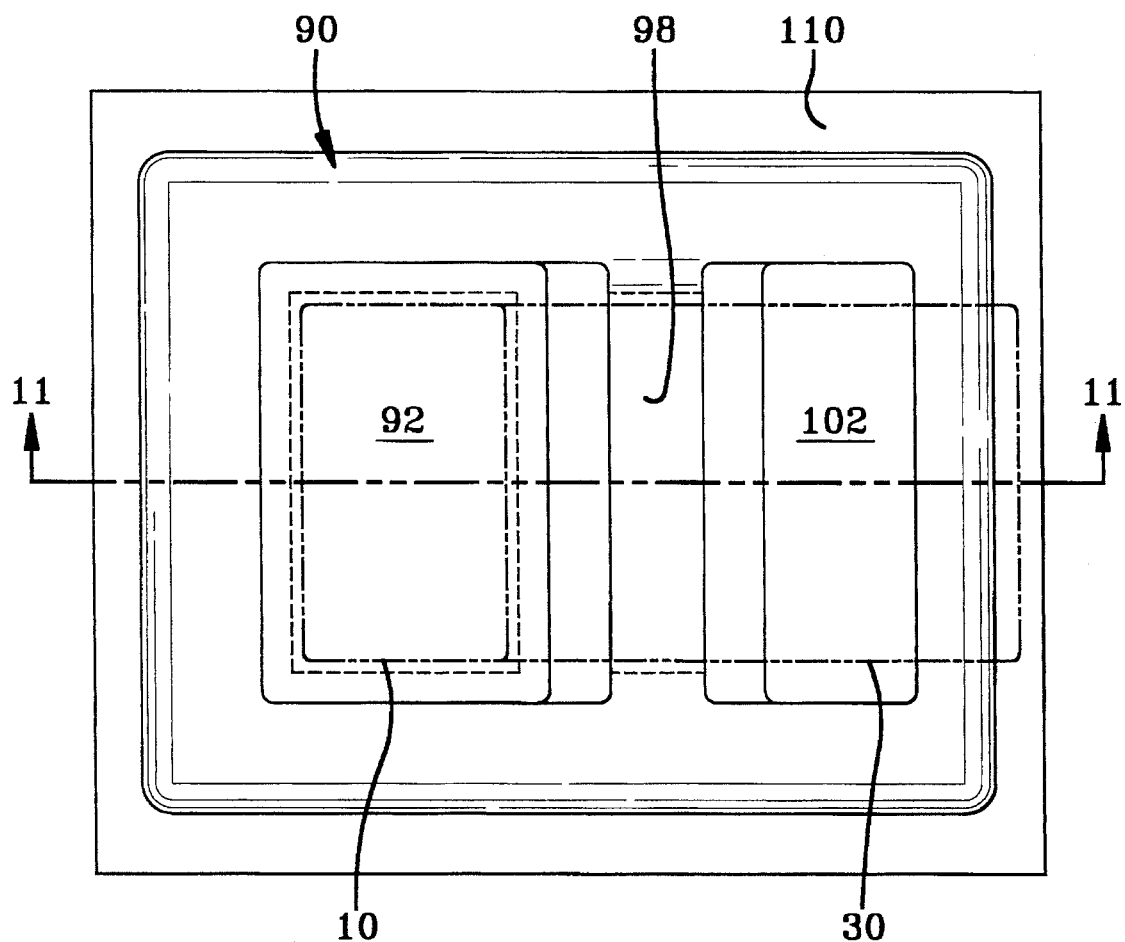
FIG. 12 is a top view of the pocket assembly of FIG. 11.

In preferred embodiments as shown in FIGS. 11 and 12, the monitoring device is contained within housing pocket 90 which has a slot for mounting the assembly within the pocket and through which the antenna of the monitoring device can project after assembly. Further, pocket 90 includes an optional substrate 110 such as to assure adhesion of pocket 90 to tire 5. The housing pocket 90 comprises a top portion or cap 92 having a pocket cavity 94 for receiving and retaining monitoring device assembly through opening 96. Pocket cavity 94 is generally of a suitable size and shape to snugly hold or secure monitoring device assembly. Pocket 90 also includes band 98 for securing and biasing antenna 30 of the monitoring device assembly to raised portion 102 of pocket 90.

Figure 13:
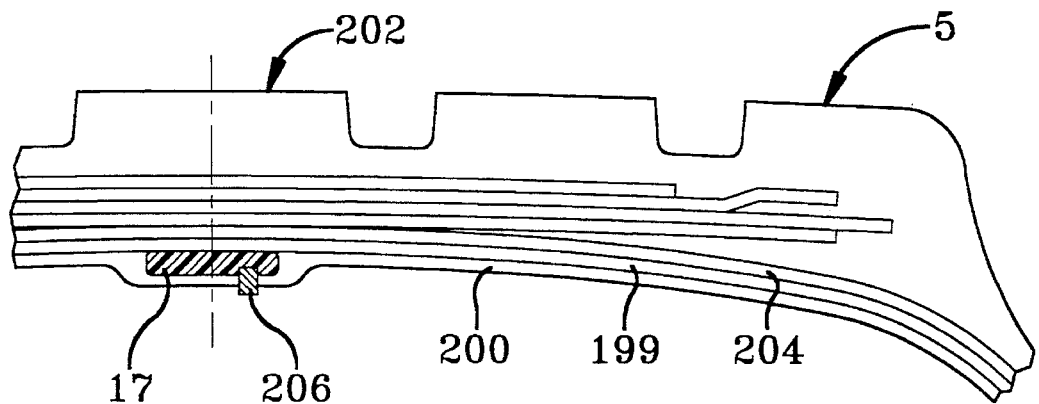
FIG. 13 is a sectional view of a tire having a monitoring device assembly embedded in the interior of the tire in the vicinity of the tire crown.
Figure 14:
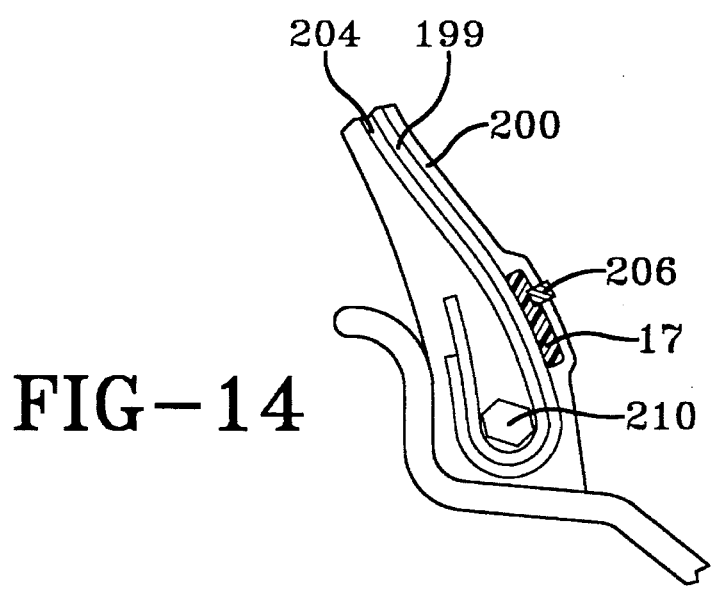
FIG. 14 is a sectional view of a tire having a monitoring device assembly embedded in the tire on the tire interior in the vicinity of the tire bead.

Another manner of securing the monitoring device assembly 17 to tire 5 is to physically embed monitoring device assembly 17 within tire 5 during the manufacture of the tire by placing the device between the tie-gum ply 199 and inner liner ply 200 of the uncured tire. After curing, the device is permanently contained in the tire structure. FIG. 13 illustrates a tire cross section containing an embedded monitoring device assembly 17 positioned in the inner liner body ply portion 200 located at or in the vicinity of tire crown 202 by this method. Crown 202 is one of the preferred locations for placement of the monitoring device. Experience has shown that the monitoring device should not contact the body ply 204 because such contact may degrade the durability and structural performance of body ply 204. Another preferred location is near tire bead 210 as shown in FIG. 14. A small removable dowel 206 is contained in the monitoring device assembly 17 at the time of placement in the green tire. The dowel 206 presses through inner liner ply portion 200 upon the application of curing pressures to form a hole or aperture for air passage to the pressure sensor in the monitor assembly 17. The dowel 206 should have suitable dimensions and a smooth, rounded end to ensure passage through the soft inner liner rubber without damaging the mold bladder (not shown) which is used during the tire curing operation. If desired, the mold bladder can be reinforced at the location of monitoring device assembly 17 and dowel 206. Dowel 206 is removed after curing of the tire, leaving a finished air hole.

Figure 15:
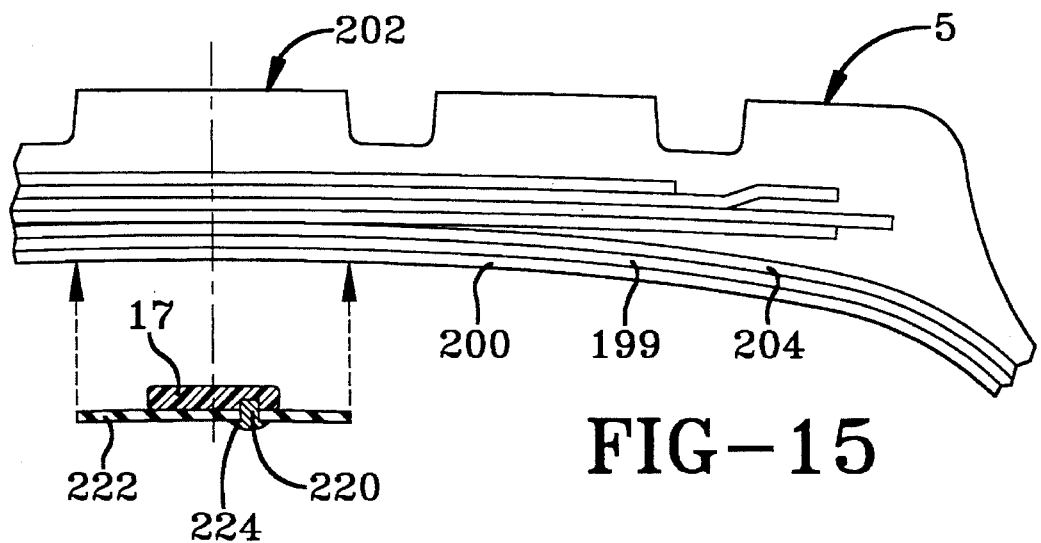
FIG. 15 is a sectional view of another embodiment of the tire showing the monitoring device assembly attached to the interior of the tire in the vicinity of the tire crown.

A second embodiment for embedding the monitoring device assembly is illustrated in FIG. 15. In this method, a dowel 220 is first inserted through an inner liner patch 222, and then into the monitoring device assembly 17. Next, monitoring device assembly 17 is sandwiched between the uncured tire inner liner ply 200 and inner liner patch 222. After curing, the monitoring device assembly 17 is permanently embedded between patch 222 and ply 200. In this procedure, a larger, contoured dowel head 224 can be employed to further reduce trauma to the mold bladder (not shown).

The various adhesive systems which can be used to adhere the monitoring device to the tire embrace numerous chemical cure adhesives including ambient temperature amine curable adhesives. Heat cure adhesives can also be used. Suitable chemical cure adhesives include conventional sulfur cure systems such as various self vulcanizing cements, various chemical vulcanizing fluids, and the like such as those sold by The Patch Rubber Company of Roanoke Rapids, N.C.

The room temperature or ambient amine curable adhesive system comprises initially applying a treating agent to the various surfaces to be adhered (e.g., tire, cover, etc.) followed by the application of various amine curable polymers or prepolymers. Suitable treating agents include various N-haloamides, the various N-halohydantoins, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutylhydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acid. A preferred treating composition for use in the practice of the present invention are the various mono-, di-, or tri-chloroisocyanuric acids, or combinations thereof. Trichloroisocyanuric acid is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the substrate is coated. Preferably, two or more coats of the treating agent or adhesive compound are used to ensure that all the cured rubber substrate surface has been coated.

Said ambient temperature amine curable adhesive systems are known to the art and literature as set forth in U.S. Pat. Nos. 4,718,469, 4,765,852, and 4,923,543, which are hereby fully incorporated by reference.

The heat cured adhesion systems generally utilize various adhesives which upon heating to temperatures of at least 100° C. and generally from about 115° to about 170° C. form an adhesive bond between the tire substrate and directly or indirectly with the monitoring device, it being understood that the curing time required is dependent on temperature, with shorter times required at higher temperatures. Suitable conventional heat cured adhesives are known to the art and include various extruder cements, various retread and vulcanizing cements, and the like, for example, those sold by The Patch Rubber Company of Roanoke Rapids, N.C.

The adhesive may be directly applied to the monitoring device, to the encased or encapsulated monitoring device assembly, to the cover or pocket for the monitoring device, or any combination thereof. Alternatively, the monitoring device or monitoring device assembly can be attached to the tire rim with a suitable adhesive. When a cover or pocket is utilized, an intermediate layer such as a cushion gum layer is optionally but desirably contained between the adhesive applied to the cover or pocket on one hand and the adhesive applied to the tire interior on the other hand to insure better adhesion of a monitoring device to the tire. Desirably, both the tire and the cover or pocket have previously been buffed and cleaned with a solvent and coated with an adhesive.

Figure 4:
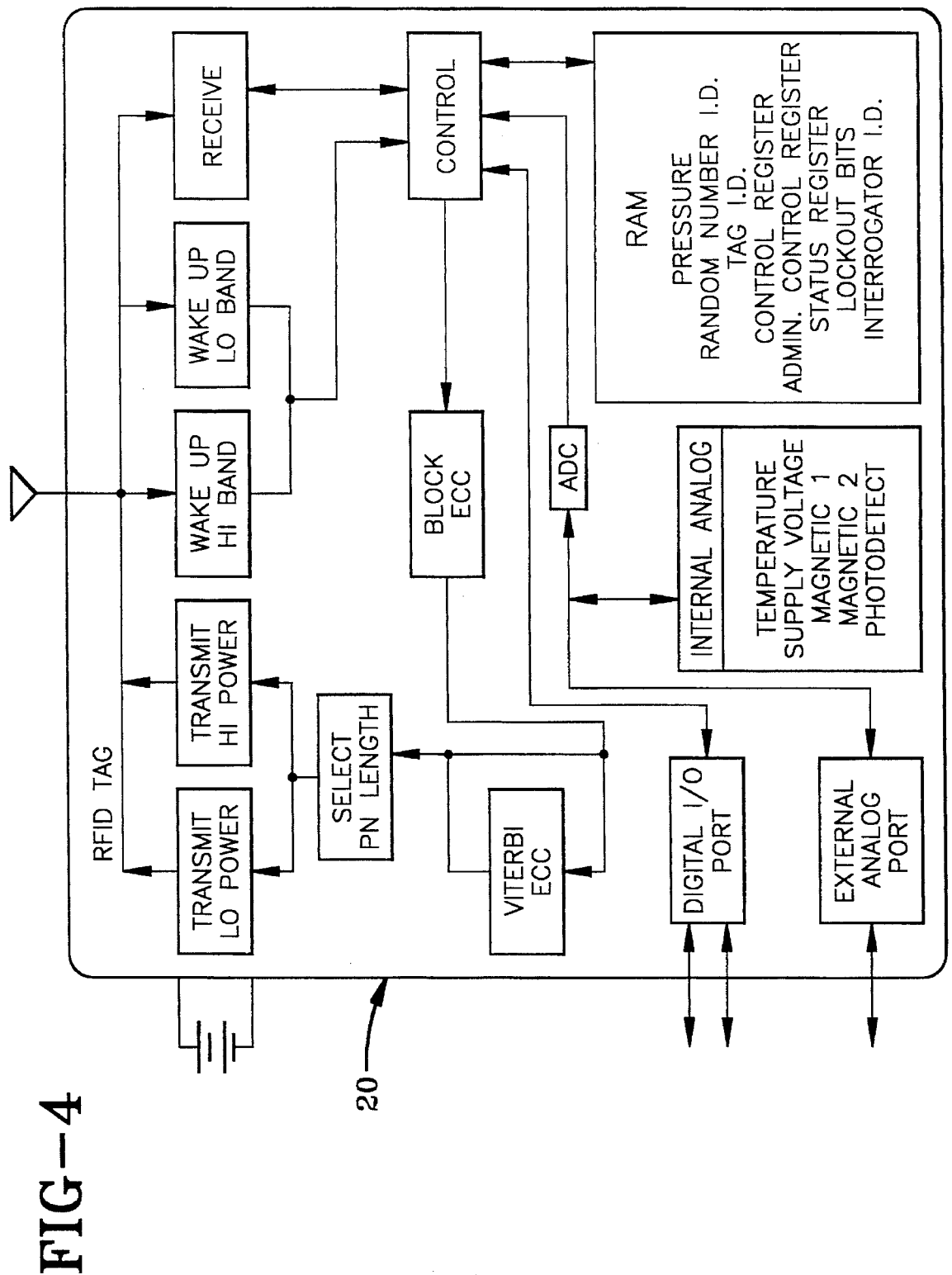
FIG. 4 is a block diagram of the micro-chip contained in the monitoring device shown in FIG. 2.

Referring now to the monitoring device or tag 10, it includes a board made of a suitable material to hold the various components, one of which is an integrated circuit or micro chip 20 as is shown in the block diagram of FIG. 4. The integrated circuit preferably includes one or more analog to digital converters for digitally coding internal and or external analog signals. Suitable integrated circuits for use with the invention are commercially available and/or can be fabricated. One such commercially available circuit 20 which has been found to be particularly well suited for use with the invention is an RFID "Micron" chip available from Micron Communications, Inc. of Boise, Id. FIG. 4 is a block diagram of the "Micron" chip which is suitable for use with the invention.

The chip 20 contains a central processing unit for processing commands, a 256 byte random access memory and micro wave radio circuitry for transmission and reception of data. The center frequency of transmission is 2.45 GHz. Circuitry for low and high frequency transmission bands are utilized by the chip to wake up or turn off to outside transmissions (instructions), according to a scheme developed by Micron and defined in their protocol publication of Jul. 22, 1993, pre-release Ver. 0.95. Internal sensors for monitoring temperature, supply voltage, magnetic field strength and ambient light intensity are contained in the chip. The chip also has communication ports supporting digital and analog input/output functions. The analog port can be programmed to source up to 2 milliamps of current. Analog input voltages from 0 to 2.5 volts can be read for monitoring external sensors. Up to 256 analog ports can be sampled by multiplexing. The chip can execute up to 30 predefined commands sent by radio transmission. These commands include functions dealing with tag identification, memory read/writes, I/O port read/writes, alarm threshold settings, password/security and enable/disable commands.

The integrated circuit 20 also preferably includes the already discussed internal sensors and/or one or more external analog ports for receiving an analog signal from one or more external sensors. The device optionally but preferably includes a pressure transducer which is preferably a solid state device such as a piezo-resistive pressure sensor. Suitable piezo-resistive pressure sensors are available from Lucas NovaSensor. Particularly preferred are Lucas NovaSensor's NPC-103 series sensors.

The temperature sensor can also generally be any conventional sensor such as Model No. LM 35 CAZ made by National Semiconductor. The tire mileage detector can give out a readout signal in miles, kilometers, etc., and preferably may be in the form of a mild magnetic detector responsive to an external magnetic field which field is sensed by the detector upon each full revolution of a tire. Alternatively, a detector may detect each up or down cycle of the tire and produce a signal which is counted. This counted number can then be sued to calculate tire mileage. An additional sensor which can be utilized is a speed sensor which monitors the speed of the vehicle.

The electronic monitoring device or tag 10 contains various components for receiving and transferring information to the interrogator. A specific component is the amplifier 42 which is used to boost the analog signal received from various sensors and transmit the same to the chip and subsequently to the interrogator. The amplifier can be connected to an external analog port of the microchip 20. The electronic monitoring device is active inasmuch as it contains a power source such as a battery and thus is self-powered. Any conventional long life alkaline battery 44 can be utilized such as a 0.07 amp hour, lithium thionyl chloride battery, type 7–10 made by Battery Engineering, Inc., of Hyde Park, Mass.

Figure 3:
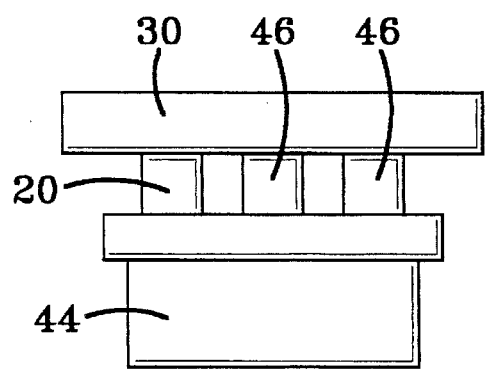
FIG. 3 is a side elevation view of an alternate configuration of the electrical components and antenna of the monitoring device shown in FIG. 2.

Monitor 10 also includes a microwave antenna 30 which can be located either adjacent to the monitoring device shown in FIG. 2 or alternatively on the backside thereof as shown in FIG. 3. The antenna 30 can be a suitable conducting means such as a single serpentine narrow wire or a thin sheet of a metal foil, for example, copper, so long as it has a resonance frequency similar to the microwave transmission frequency. Generally, any microwave frequency can be utilized such as from about $1 \times 10^9$ to about $5 \times 10^9$ hertz with a suitable frequency being from about 2.40 to about $2.49 \times 10^9$ hertz.

Another embodiment, not shown, utilizes sensors exterior of monitoring device 10 as in the form of decals having lead lines running to the monitoring chip.

Figure 5:
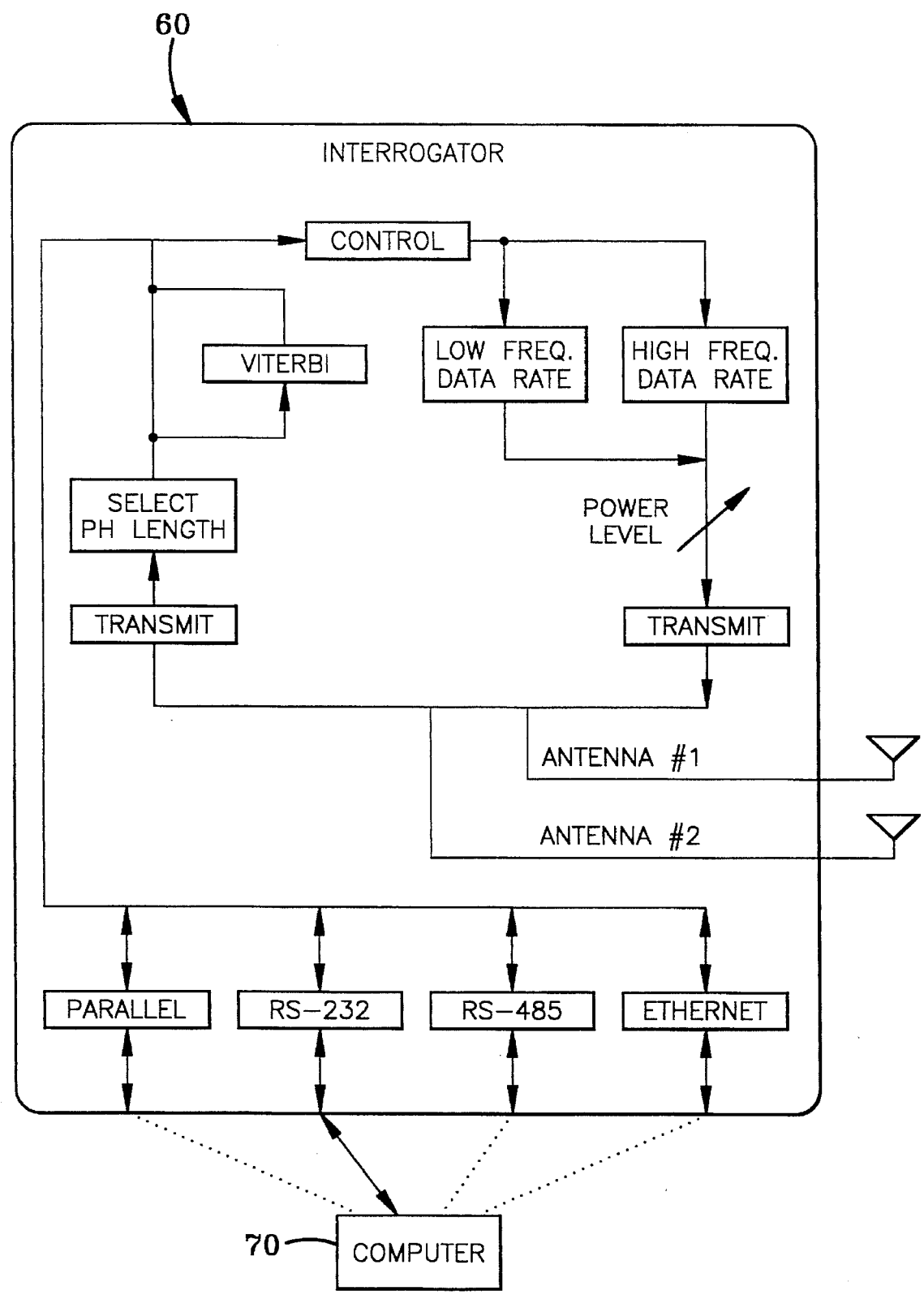
FIG. 5 is a block diagram of an interrogator which communicates with and retrieves information from the monitoring device.

FIG. 5 is a block diagram of a generic type interrogator 60 which can be used to communicate with and retrieve digitally coded information from the electronic monitoring device. The interrogator includes microwave transmitter and receive circuits for communicating with the micro chip. The RP transmitter utilizes dual frequency bands so that only tags (i.e. monitoring devices) programmed to respond to a certain band will be activated, leaving the others dormant and conserving battery power. This is called "data band switching" and is defined as part of the public domain Micron protocol. The interrogator includes circuitry to receive and transmit using spread spectrum modulation as defined in the Micron protocol and as required by the FCC for microwave communication devices. The power level of transmission is user selectable and either one or two antennas can be employed by the interrogator to improve reception. The interrogator includes I/O communications hardware to support interaction with a host computer via parallel, serial RS-232, RS-485 and Ethernet links. A commercially manufactured interrogator of the type described is available from Unisys Corp., Salt Lake City, Utah. The interrogator can be interfaced with a computer 70 to allow downloading, archiving, and analysis of data transmitted from the electronic monitoring device 10. Moreover, different interrogators or a plurality thereof can be utilized with respect to different interrogation situations.

The interrogator can be remotely located in a vehicle, e.g., a truck, to permit intermittent monitoring at regular intervals such as every thirty minutes, to alert the driver of the vehicle of any imminent or impending problems such as over or under inflation or abnormally high temperatures. Alternatively, the interrogator can be located at a vehicle service stop, e.g., fuel station, trucking terminal, or at any other convenient location for archival, and/or current sensor readouts of tire pressure and tire revolutions, etc., as through visual readouts, flashing lights, etc., as noted above. The monitoring devices in each tire can be interrogated for information at regular or arbitrary intervals and the data can be stored on a computer interfaced to the interrogator. The monitoring device 10 can also be programmed to act as an alarm system to warn of extreme temperature or pressure conditions, or it may be used to log pressure and/or temperature histories during tire operation. Such data can be used, for example, to evaluate the retreadability of truck tires.

The interrogator includes various features such as software protocol for sorting, identifying and communicating with multiple monitoring devices without ambiguity, thus enabling a signal interrogator to quickly sort and retrieve information from a plurality of monitoring devices associated with individual tires on a vehicle or on multiple vehicles. The broadcast range, from within a tire can vary, such as in excess of fifty feet, thus permitting a stationary interrogator to quickly query all tire chips on a vehicle which is passing by the interrogator or from an on board vehicle location.

In accordance with the preferred mode of the invention, a tire is provided with a self-powered monitoring device on the interior or within the tire or on the tire material. The monitoring device includes means to sense and store data regarding a tire condition, such as temperature or pressure. In response to a triggering signal, the power source of the monitoring device is activated and the device transits the condition data. For example, the monitoring device may be identified by having the interrogator read the identification code associated with the tire to which the monitoring device is affixed. The identification code can, for example, be stored as a 10 byte number, the first 4 bytes containing a standard international classification (SIC) code, the next 2 bytes containing a specialty code, and the last 4 bytes identifying the particular tire. Further in accordance with the preferred mode of the invention, the monitoring devices 10 include low to high data band switching for selective communication between multiple interrogators and multiple monitoring devices. The low band can correspond to a dormant mode wherein battery power is conserved. Monitoring device 10 will remain dormant unless an interrogator broadcasts a low band instruction to activate the device. The monitoring device and interrogator frequencies can be switched upon command. This allows for selective groups of monitoring devices to become active and respond to an interrogator broadcast while others remain dormant. The monitoring device frequency can be switched by an externally measured event which is being monitored by a sensing device (e.g. temperature) so that it activates in response to an interrogator upon a preset limit to a monitored condition being exceeded. High and low sensor thresholds can be programmed to determine when frequency switching occurs, thus enabling the monitoring devices to operate an alarm mode.

Also in accordance with a preferred mode of the invention, communications between multiple monitoring devices and an interrogator or multiple interrogators is facilitated by means of an arbitration method, thereby permitting unambiguous communications. The interrogator, monitoring device, and data communication protocol preferably allow various commands to be transmitted from the interrogator to the monitoring device. Examples of desired commands include functions dealing with tire identification, memory, digital and analog port read/writes, alarm threshold settings, password and security data and enable and disable commands. These commands determine the functionality of the monitoring device and permit customization of operation for different applications. For example, through software commands a monitoring device can be set to ignore inquiries from an interrogator unless a tire temperature exceeds a certain threshold or an air pressure falls below a given set point. Alternatively, the monitoring device could be set to respond to an on board vehicle interrogator request for periodic readings of temperature and pressure during tire operation in the field. Battery life would dictate the frequency and duration of communications that are possible.

While in accordance with the patent statutes the best mode and preferred embodiment has been set forth, the scope of the invention is not limited thereto, but rather by the scope of the attached claims.

What is claimed is:

1. A tire having means for monitoring at least one engineering condition of the tire, comprising:

the tire mounted on a rim defining a pressurizable cavity between the tire and said rim;

a monitoring device, said monitoring device in fluid communication with said pressurizable cavity and located on a boundary of said pressurizable cavity so as to minimize stress, strain, cyclic fatigue, impact and vibration, said monitoring device including a battery, a circuit for data band switching, an integrated circuit including means for storing data, at least one sensor for sensing each engineering condition, means for converting each of said sensed conditions to data for storing, means for energizing the circuit for data band switching to activate the battery from a passive mode to an active mode, means for transmitting said data responsive to a signal while the battery is active, and means for energizing the circuit for data band switching to deactivate the battery from the active mode to the passive mode after transmitting said data.

2. The tire having means for monitoring as set forth in claim 1, wherein said signal is a microwave frequency signal.

3. The tire having means for monitoring as set forth in claim 2, further including an antenna for receiving the signal and for transmitting said data.

4. The tire having means for monitoring as set forth in claim 1, wherein said monitoring device includes means for comparing the sensed engineering condition with a preselected limit and means for transmitting the sensed engineering condition as a signal when the condition exceeds said preselected limit.

5. The tire having means for monitoring as set forth in claim 1, wherein said monitoring device is located in a center portion of a tread crown below a body ply.

6. The tire having means for monitoring as set forth in claim 1, wherein said monitoring device is located in the vicinity of a tire bead below a body ply.

* * * * *